Patented Oct. 14, 1930

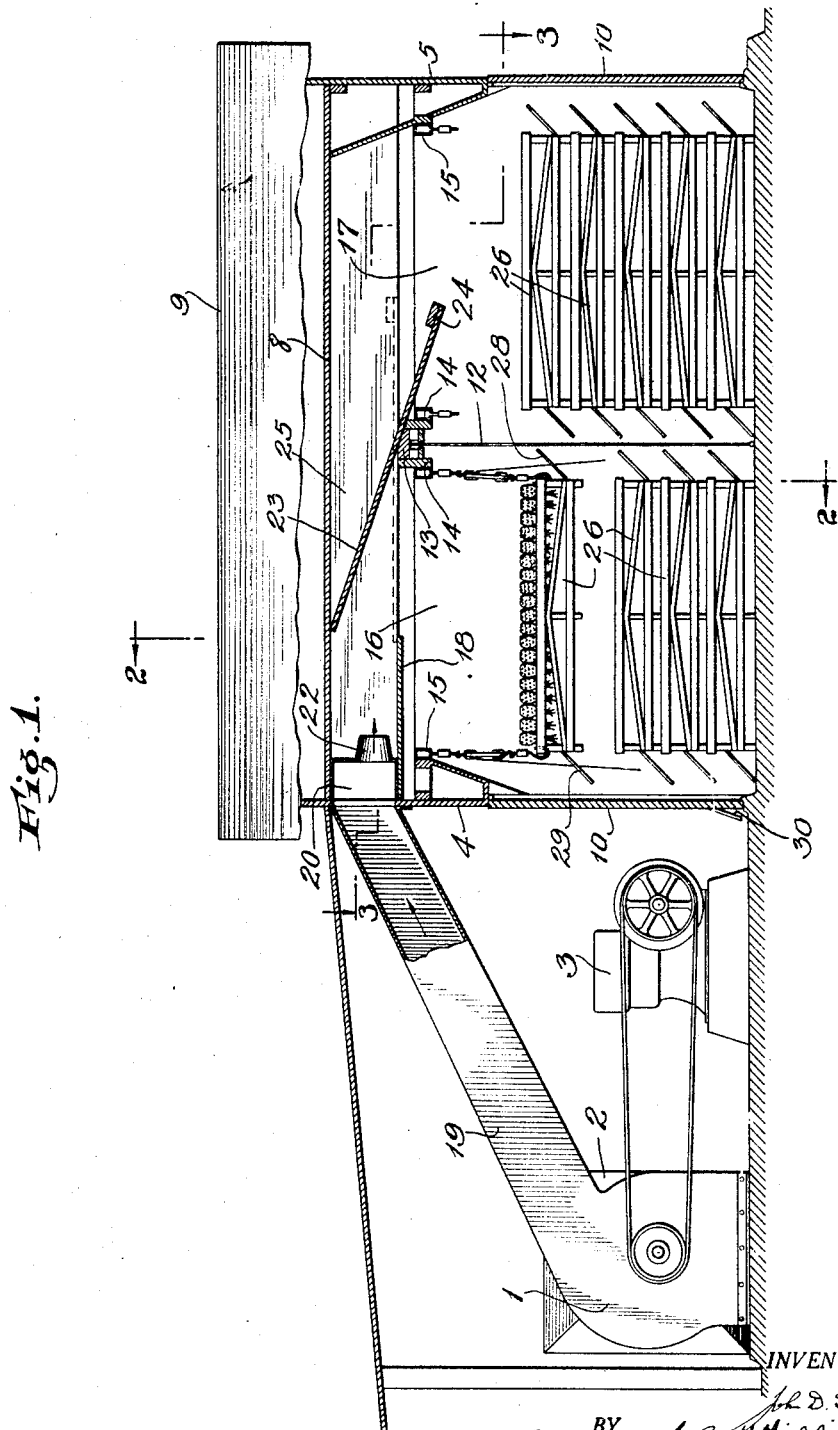

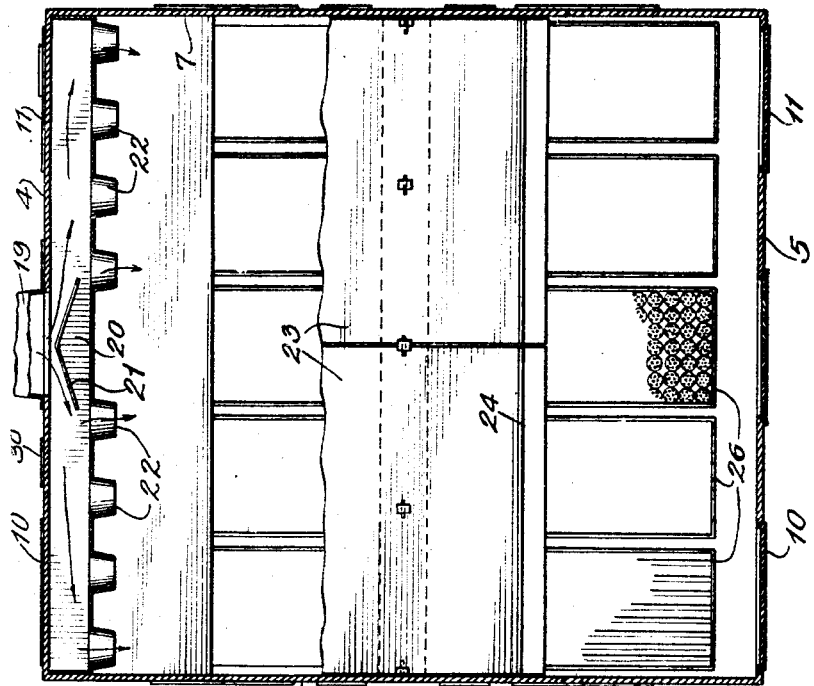
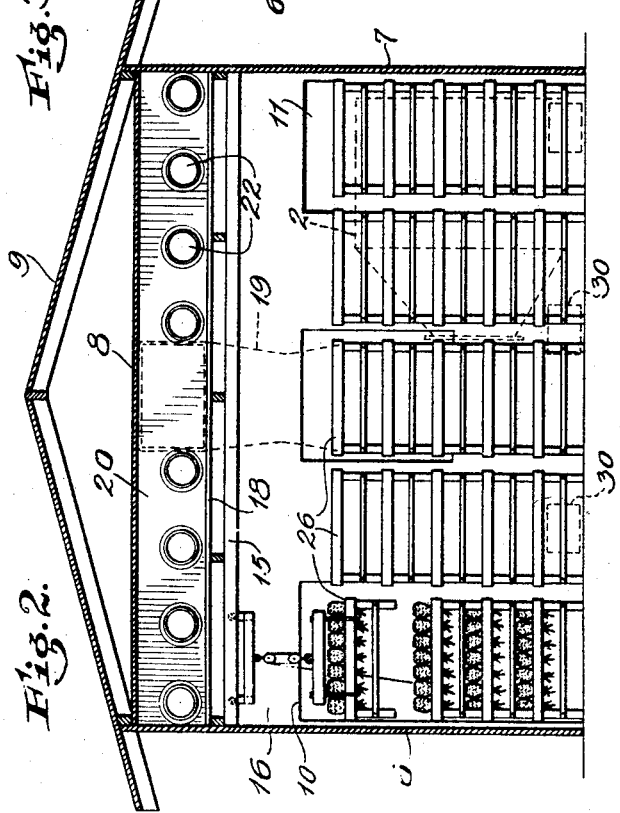
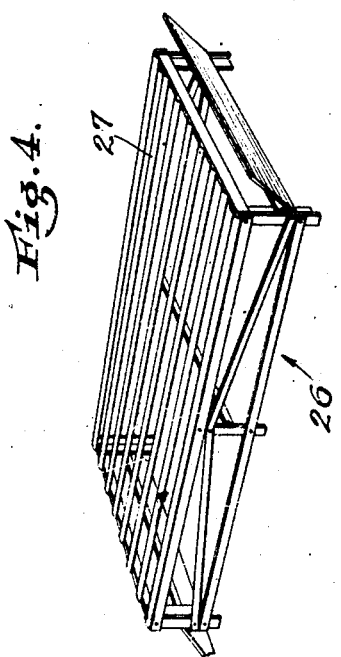

1,778,047

UNITED STATES PATENT OFFICE

JOHN D. STUBBE, OF SAN JUAN, PORTO RICO

APPARATUS FOR DRYING FRUITS

Application filed January 2, 1929. Serial No. 329,854.

The invention relates to the evaporation of moisture from the surface of fruits and vegetables and is more particularly useful in tropical countries where high humidity is the prevailing condition of the atmosphere and where frequent and sudden rains interfere with the usual method of sun drying. The invention is described with particular reference to the drying of pineapples, but it is to be understood that it is equally applicable and useful where, in the case of other fruits and vegetables, similar conditions exist.

Pineapples, in comparison with other fruits and vegetables, are particularly susceptible to decay and are particularly difficult to dry by reason of their rough surfaces, especially in the regions of the crown and butt. Moisture collects in the crevices and interstices in these regions and consequently it is difficult to dislodge or otherwise remove it. Sun drying, if sufficiently protracted, is sufficient for the purpose but in many parts of the world in which pineapples are grown, exposure to sunlight for a sufficient length of time, to bring about complete drying, is practically impossible by reason of the frequent and sudden rains, above mentioned.

The object of my invention, broadly stated, is to overcome the difficulties above mentioned, to bring about a thorough drying of the fruit in as short a time as possible and to provide an apparatus whereby the drying process may be made substantially continuous.

Subordinate objects are to produce an apparatus in which the utmost efficiency may be secured from a given rate of supply of fuel or other heat producing means, and this involves a proper placing of the pineapples to be dried and an effective distribution of air currents.

Referring to the drawings,

Fig. 1 is a view in elevation showing an apparatus for supplying the necessary heated air, and the enclosure in which the fruit is dried.

Fig. 2 is a view on the line 2—2 of Fig. 1.

Fig. 3 is a view on the line 3—3 of Fig. 1.

Fig. 4 is a perspective view of one of the crates which contain the fruit, in this instance pineapples, during the drying process.

A suitable blower of a capacity sufficient to supply the necessary quantity of heated air is indicated by the numeral 1, and a suitable heating apparatus for heating the air on the intake side of the blower is indicated by the numeral 2. The blower may be operated by any suitable prime mover, such as an internal combustion engine 3.

The enclosure may be conveniently constructed on rectilinear lines comprising the end walls 4 and 5 and the side walls 6 and 7. The enclosure is covered by a ceiling 8 over which, for the sake of protection against the weather, there may be built a roof 9.

The enclosure is provided with suitable doors 10, 10 and 11, 11 through which the crates of fruit may be introduced and removed, as hereinafter more particularly described. The enclosure is divided into two compartments by a partition of any suitable construction, such as that indicated by 12, in this instance a tarpaulin. The tarpaulin is suspended from a suitable cross beam 13 from which depending tracks 14, 14 are run the trolleys from which the crates are supported in the process of introduction and removal. Similar rails 15, 15 are also provided, these being supported from the end walls as shown.

The compartments may be designated by the numerals 16 and 17 respectively, the compartment 16 being provided in its upper portion with a semi-partition 18, the width of which may be about one-half the width of the compartment itself. From the blower recedes the conduit 19 leading into the manifold 20, which may extend the entire width of the compartment 16. In the manifold, as is shown in Fig. 3, is a baffle 21 for dividing the current of air emerging into the manifold into two streams, one in one direction and one in the other. The result of this is that the streams of air emerging from the tuyères 22 are substantially uniform in quantity and velocity, thus effecting a definite distribution of the heated air across the compartment.

On the cross beam 13 is hingedly mounted the baffle 23 which may extend the entire length of the cross beam. The baffle may be counterweighted by the counterweight 24 for ease in manipulation. When the baffle is in the position shown in full lines in Fig. 1, it is obvious that the air discharged from the tuyères 22 will be deflected by the baffle into the compartment 16. When the baffle is in the position shown by dotted lines in Fig. 1, the air discharged from the tuyères will pass through the conduit 25 into the compartment 17. Obviously, then, either compartment may be used at any given time as a drying chamber.

A suitable form of crate for use in drying pineapples is shown in Fig. 4, and a plurality of them stacked up are shown in Fig. 1. The crates, which may be indicated as a whole by the numeral 26, are provided with suitable longitudinal slats 27, and the pineapples are placed with the crowns down projecting through the spaces between the slats. The crates may be stacked and at the same time provide ample space for the free circulation and distribution of air about the pineapples which they support. Each crate may be provided with two baffles, one indicated by the numeral 28 which is inclined slightly upwardly, and the other with the baffle 29 which is inclined slightly downwardly. The trolleys are provided with suitable tackle indicated as a whole by the numeral 29, whereby the crates may be run in and out of the compartments at any desired elevation above the flooring.

In operation, it may be assumed, for example, that compartment 16 is being used for a drying chamber, and that it has been charged with a number of crates of pineapples to be dried. The heated air passing through the conduit 19 is discharged through the tuyères from the manifold 20, and since the baffle 23 is in a raised position, as shown in full lines in Fig. 1, it passes downwardly along the partition between the compartments, and thence assisted by the baffles 28 is distributed among the crates, and passes horizontally about the fruit, thence emerging at the opposite ends and thence out through the ports 30.

While the drying process is going on in compartment 16, compartment 17 is being charged with crates of fruit for drying. As soon as the fruit in compartment 16 is sufficiently dried, the baffle 23 is lowered thus closing off the current of air from compartment 16 and directing it through the conduit 25 into the compartment 17, where a similar procedure takes place. During the drying of the fruit in compartment 17, compartment 16 is unloaded and charged ready for the next operation, so that the process is substantially continuous.

Having thus described the illustrated embodiments of my invention and having in mind that variations and modifications of the same may be made, I define the scope of the invention by the following claims.

I claim:

1. Apparatus for drying the surface of fruit comprising a blower, a source of heat for heating the air discharged by the blower, two adjoining compartments separated by a vertical partition of a height less than that of the outside walls of said compartments, a conduit leading from the discharge side of said blower into a manifold arranged along the wall of said compartment opposite said partition and near the ceiling of said compartment, said manifold being provided with a line of spaced discharge orifices opening into said compartment, a baffle hinged to the upper edge of said partition and adapted to be swung to positions respectively above and below said orifices to direct the air discharged therefrom into one or the other of said compartments at will.

2. Apparatus for drying the surface of fruit comprising a blower, a source of heat for heating the air discharged by the blower, two adjoining compartments separated by a vertical partition of a height less than that of the outside walls of said compartments, a conduit leading from the discharge side of said blower into a manifold arranged along the wall of said compartment opposite said partition and near the ceiling of said compartment, said manifold being provided with a line of spaced discharge orifices opening into said compartment, a baffle hinged to the upper edge of said partition and adapted to be swung to positions respectively above and below said orifices to direct the air discharged therefrom into one or the other of said compartments at will, and a plurality of crates provided with baffles for directing the air currents on the fruit to be dried.

In testimony whereof, I have signed this specification.

J. D. STUBBE.